April 9, 1935. J. P. BURKE Re. 19,516

NONREFILLABLE DEVICE

Original Filed Sept. 29, 1932

Inventor
James P. Burke
By S. Jay Teller
Attorney.

Reissued Apr. 9, 1935

Re. 19,516

UNITED STATES PATENT OFFICE 19,516

NONREFILLABLE DEVICE

James P. Burke, Knoxville, Tenn., assignor, by mesne assignments, to Colt's Patent Fire Arms Manufacturing Co., Hartford, Conn., a corporation of Connecticut Original No. 1,938,063, dated December 5, 1933, Serial No. 636,171, September 29, 1932. Application for reissue May 31, 1934, Serial No. 728,449

29 Claims. (Cl. 215—7)

This invention relates to nonrefillable devices.

One object of the invention is to provide a device of the character described having improved nonrefillable means including a closure having a frangible portion and adapted for limited angular movement, arranged so that an axial force is exerted on the closure as a result of said movement, to break the frangible portion and permit removal of the closure means.

Another object of the invention is the provision of an improved nonrefillable closure including a plurality of members individually connected to a container and interconnected with each other or otherwise restricted as to movement, according to an arrangement such that the closure cannot be removed from the container except by breaking the closure at or near the point of interconnection between the members.

Another object of the invention is the provision of an improved device having relatively few and simple parts, which are inexpensive to mold, manufacture and assemble, and which are compact and neat in appearance, durable, reliable, and efficient in use to a high degree.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

Figure 1:
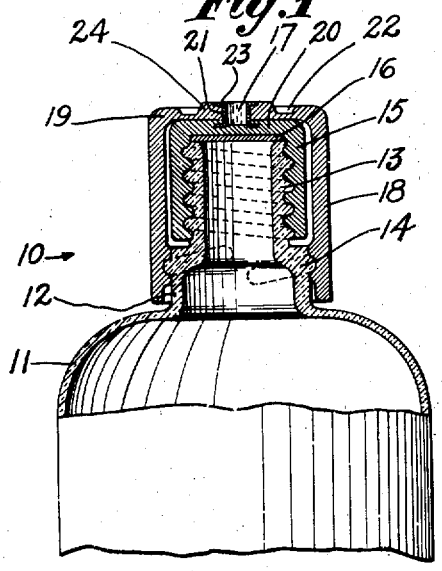
Figure 1 is a fragmentary view in side elevation with parts in section showing an embodiment of the invention.
Figure 2:
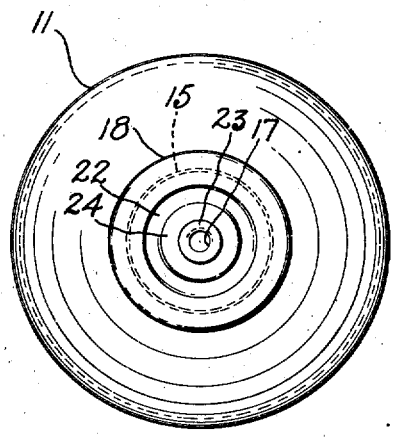
Fig. 2 is a top plan view thereof.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Generally described, this invention provides a closure of such nature that it cannot be removed except by breaking the same, and the invention is applicable to containers, tubular devices and other receptacles. The utility of the invention may be especially noted in connection with nonrefillable closures. The invention may include a closure member and a sealing member coacting therewith as by extending thereover, but generally speaking, a closure means is provided having a frangible portion and connected to the container by guides, threads or cams, and so arranged as to have or be adapted to have a limited angular movement, if desired, preventing removal of the closure means, but sufficient to cause exertion of a force in a suitable direction, preferably axially, so as to cause breakage of the frangible portion and permit removal of the closure. It is preferred that a broken or deformed portion shall remain in engagement with the container or closure for indicating that the container has been opened. The closure may be slidable for connection along any suitable path, and the axial force may be created by reaction against any desired part of the container closure unit. For illustrating a specific embodiment of the invention, the closure and sealing members may be individually connected to the container along similar paths or paths of different or even opposite directions, and one of the members may have a frangible portion or a yielding portion associated therewith, the members being interconnected at or adjacent to the frangible or yielding portions against inter-relative axial movement, except on causing exertion of a force sufficient to break the frangible or yielding part. By centrally forming the interconnection between the members, the operation of assembling the closure is facilitated, and the sealing member can be turned to some degree without turning the closure member; while if the members are movable, if at all, in different directions, a wedging or jamming action can be obtained, militating against removal of the closure, except that the breakage of the frangible portion may occur in the manner described.

Referring in detail to the drawing, 10 denotes a device embodying the invention. This may include a container 11 of any suitable material such as glass, having a neck 12 that may have suitable engagement means such as threaded portions 13, 14, the latter being of different position or diameter and preferably larger than the former. The thread at 14 may be sufficiently short to constitute in effect a cam or inclined guide means, but these terms are used as equivalents herein.

Connected on the portion 13 is a closure member 15 of any generally conventional construction, and which may have an internal sealing liner disc 16 if desired. The closure member 15 may also have a central engagement projection or pin 17, such as an eyelet, for instance, that can be connected or headed over to form a permanent connection.

Coacting with closure member 15 is a sealing member 18 which may be variously coordinated with the closure member as by extending thereover. This sealing member may be in the form of a cap or the like, and may have a threaded or cam portion for engagement with the portion 14. Preferably the end wall 19 of the sealing member may lie closely against or alongside of the corresponding end wall of the closure member 20, and it may have a central end opening 21 for receiving the projection 17. A part of the closure means, or one of the members 15, 18 may have a deformable or frangible portion, and preferably the sealing member may be provided with an annular recess 22 extending around the connecting projection or in spaced relation thereto, while the projection may be headed over at 23 on the part of the sealing member in proximity to or within the recess.

The closure and sealing members may be made of any suitable materials, such as metal, or composition materials, while the projection 17 is preferably metal moulded into the closure member 15.

The thread at 14 may have a different or larger lead than the thread for the closure member, and said threads may be right and left hand threads if desired. Hence any turning movement of the sealing member that might be communicated to the closure member could not be used to open the closure. If the pin 17 is mounted in a swiveled manner, said threads may also extend in the same direction and have the same lead.

To assemble the device, the closure member 15 is screwed tight, and then the sealing member 18 is screwed home, the projection 17 passing through hole 21. Then the projection is headed over by pressure or spinning and the device is complete.

To open the device, the sealing member may be turned in a right hand direction, creating an axial tension on the locking means 17 and causing a fracture along the recess 22. The sealing member can then be removed and discarded, but the portion 24 may remain permanently connected to the closure member and indicate that the bottle has been opened.

It will be observed that these are two separate means engaging the sealing member 18, one of the said means, the cam portion 14 of the container, engaging the main body of the sealing member and serving to prevent direct upward relative movement thereof while permitting relative rotative movement, and the other of the said means, the locking element 17, serving to break the readily breakable portion of the said member upon relative rotative movement of predetermined extent. The element 17 effects breaking by applying a force to the breakable element at an angle to the direction of rotative movement, such force in the present instance being applied in the direction of the axis of the sealing member. At least one of the said means engaging the sealing member connects it directly with the closure member 15, and preferably and as shown the other of the said means connects the sealing member directly with the container.

Figure 3:
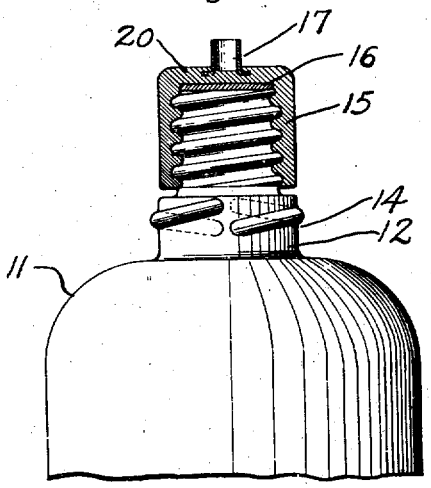
Fig. 3 is a view in vertical elevation with parts in section of a device in course of manufacture.

The locking or breaking element 17 is preferably carried initially by the closure member 15 as clearly shown in Fig. 3, and its construction is such that it permits free relative movement of the sealing member 18 into its normal position in engagement with the cam portion or threads 14 on the container; but the said breaking element 17 when headed over as shown in Fig. 1 is adapted to engage the frangible or breakable portion of the sealing member, in this case the top portion 19, so as to break the said top portion upon relative movement of the sealing member out of its normal position as shown in Fig. 1. Although the breaking element 17 does not initially engage the sealing member, the said top portion 19 thereof is nevertheless specifically shaped as shown in Fig. 1 for engagement by the said breaking element.

It has already been stated that the two threads on the container may be right hand or left hand, or may be of the same hand but of different leads. Fig. 1 shows right and left hand threads; and Fig. 3 shows threads of the same hand but of different leads. In either case the differential relationship of the two threads causes the breaking of the top portion of the sealing member upon rotation of the said member in the unscrewing direction. With the right and left hand threads as shown in Fig. 1, unscrewing of the sealing member tends to tighten the closure member, and inasmuch as the top portion 19 of the sealing member is held by the breaking element 17 the said top portion is broken out as already described. With threads of the same hand but of different leads, as shown in Fig. 3, unscrewing movement of the sealing member might cause simultaneous rotation of the closure member if the closure member should be at all loose. However, if the closure and sealing members were to rotate in unison, they would rise at different rates and this would cause the breaking of the top portion of the sealing member. As illustrated in Fig. 3 the thread 14 has a coarser lead than the thread engaged by the closure member and the sealing member would rise faster upon rotation of the two members in unison. Inasmuch as the members are connected together by means of the breaking element 17 the more rapid rise of the sealing member would cause the top portion thereof to be broken out.

Figure 5:
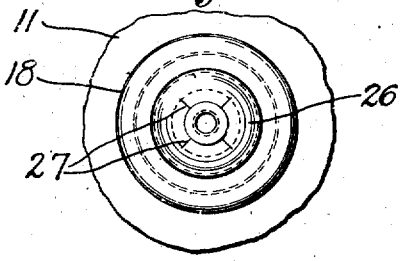
Fig. 5 is a top plan view thereof.
Figure 4:
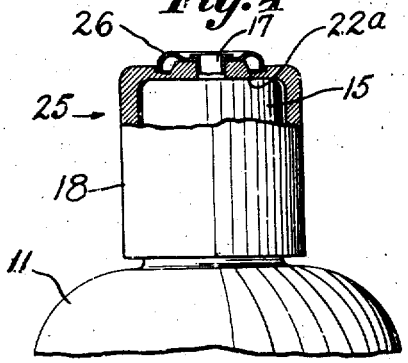
Fig. 4 is a view in elevation with parts in section showing a modification of the invention.

In Figs. 4 and 5 is shown a modification of the invention which may be in all respects similar to that hereinbefore described, except that the closure means 25 has associated therewith a member adapted to overlie the line of fracture so as to prevent a person's hand from being scratched or cut thereby. For example, a plate like element 26 may be centrally secured by the projection 17 when the same is headed over. This element 26 may extend over the recess 22a, and may consist of metal. Preferably a transparent material such as celluloid or the like is employed so as to render the line of fracture clearly visible, and the recess 22a may be deepest at its inner periphery so that the fracture may occur there. By making the element 26 resilient and cup shaped, it will thus be assured of moving downward and enclosing around the line of fracture. The resilience and degree of flexure may be enhanced by radially slotting the element at 27.

It will be appreciated that various changes and modifications may be made in the device as shown in the drawing, and that the same is submitted in an illustrative and not in a limiting sense, the scope of the invention being defined in the following claims.

I claim:

1. A device including a container having a closure member, a sealing member over the closure member, the sealing member having a frangible portion, said members being positively connected with the container so as to be individually differently movable relative thereto, said members being snugly interconnected to prevent any movement of either relative to the container except on breaking the frangible portion, and so that a force applied for opening the sealing member tends to increase the closing action of the closure member.

2. A device including a container having a closure member, and means including a sealing member thereover, the sealing member being connected to the closure member and threaded to the container, said means having a portion that is adapted to give way under a force applied to the sealing member so as to release the latter from connection with the closure member.

3. A nonrefillable closure device including a container, and means including a closure member for the container and a sealing member extending over the closure member to prevent removal thereof, said members having interconnecting means including means for individually connecting the members to the container to prevent removal of the sealing member from the container, the sealing member having a frangible portion whereby a portion of the sealing member can be removed from the container to permit removal of the closure member, and said means acting between the container and sealing member being actuable for causing an axial breaking force to be exerted on the frangible portion.

4. A device including a container and closure means therefor having a portion threadedly connected with the container and a cooperating means acting in the direction of the axis of the closure means for preventing angular movement of said portion so that a force is exerted on the said portion in the axial direction by subjecting said portion to an angular force, said closure means having a frangible portion adapted to be broken by said axial force.

5. A device including a container and closure means therefor having a portion threadedly connected with the container and a cooperating means acting in the direction of the axis of the closure means for preventing angular movement of said portion so that a force is exerted on the said portion in the axial direction by subjecting said portion to a torque, said portion having an annular frangible portion adapted to be broken by said force.

6. A device including a container, a closure member therefor, and a sealing member over the closure member, one of the members having a frangible portion, said members having individual locking portions for connecting the members to the container, said locking portions being characterized in that they are movable in different directions to each other for connection with the container, and the members being interconnected with each other so that the locking portions cannot be released and the members removed from the container except on breaking the frangible portion.

7. A device including a container, and means including a closure member, and a sealing member thereover, the different members being individually connected to the container by means of right and left hand threads respectively, said means having a portion releasably interconnecting the members to prevent removal thereof from the container.

8. A device including a container, a closure member, a sealing member, the different members being individually connected to the container by means of right and left hand threads respectively, and a central element interconnecting the members against removal thereof from the container, the sealing member having an annular frangible portion extending around the central element whereby the sealing member is broken on exerting a sufficient torque thereon.

9. A device including a container, a closure member, a sealing member, the members being interconnected to each other, the members being so individually threadedly engaged with the container that the threaded connections jam on applying a torque to a member for removing the same, and one of the members having a frangible portion at the point of interconnection between the members so that the interconnection between the main parts of the members can be broken on applying a sufficient torque to a member.

10. A device having a container neck, and closure means including a closure member extending along the neck, a sealing member over the closure member, the sealing member being connected to the container neck along a line at an angle to the axis of the latter, means interconnecting the members to prevent movement therebetween along said angle, and a frangible portion whereby the sealing member can be released.

11. A device including a container having a closure member and a sealing member individually threadedly connected to the container, said members being axially interconnected and one of the members having a frangible portion in proximity to the point of interconnection for releasing the interconnection between the members.

12. A device including a container, a closure member therefor, a sealing member over the closure member, the sealing member having a frangible portion, means axially interconnecting the frangible portion and the closure member to hold the members against interrelative axial movement, and means individually connecting said members to the container so that the sealing member cannot be removed except by breaking the frangible portion.

13. A device including a plurality of coaxial closure elements having axially interconnected wall portions lying alongside of each other, the outer element having a weakened portion spaced from the axis, and shield means extending over the weakened portion.

14. A device including a container, and closure means therefor including a closure member and a sealing member, said members having connecting portions extending at different angles to effect connection with the container and the members being connected with each other so that the connecting portions are held against movement along said different angles, and one of the members having a frangible portion, for the purpose set forth.

15. A device including a container and closure means including a closure member, a sealing member thereover, and means associated with the members and the container and having portions for interconnecting the members with the container, said portions extending along different angles and coacting for wedging interaction along said different angles, the sealing member being held against movement in co-operation with the closure member to cause said wedging action, and the sealing member having a frangible portion for releasing the sealing member.

16. The combination of a container having an opening, a closure member normally closing the container opening, a sealing member structurally separate from the closure member and at least partly covering it to prevent removal thereof while the sealing member is in place and unbroken, the said sealing member having a portion adapted to be readily broken while the main body thereof remains intact, and two separate means engaging the sealing member and one of them connecting it with the closure member, one of the said means engaging the main body of the sealing member to prevent direct upward movement of the said member while permitting relative rotative movement thereof and the other of the said means directly engaging the readily breakable portion of the sealing member, and the said two means cooperating to cause the means engaging the breakable portion to apply a breaking force at an angle thereto upon a relative rotative movement of predetermined extent.

17. The combination of a container having an opening, a closure member normally closing the container opening, a sealing member structurally separate from the closure member and at least partly covering it to prevent removal thereof while the sealing member is in place and unbroken, the said sealing member having a portion adapted to be readily broken while the main body thereof remains intact, and two separate means engaging the sealing member and connecting it respectively with the closure member and with the container, one of the said means engaging the main body of the sealing member and serving to prevent direct upward relative movement thereof while permitting relative rotative movement and the other of the said means directly engaging the readily breakable portion of the sealing member, and the said two means cooperating to cause the means engaging the breakable portion to apply a breaking force at an angle thereto upon a relative rotative movement of predetermined extent.

18. The combination of a closure member adapted to normally close a container opening, an externally visible preformed readily breakable sealing member structurally separate from the closure member and at least partly covering it to prevent removal thereof while the sealing member is in place and unbroken, means normally serving to prevent direct upward relative movement of the sealing member while permitting relative rotative movement, and means engaging with the closure member and the sealing member and serving in cooperation with the first said means to apply a breaking force to a portion of the sealing member so as to break the said portion upon a relative rotative movement of predetermined extent.

19. The combination of a closure member adapted to normally close a container opening, an externally visible preformed readily breakable sealing member structurally separate from the closure member and constituting an outer closure substantially completely covering the first said closure member, the said sealing member having a portion at the top adapted to be readily broken while the main body thereof remains intact, means normally serving to prevent direct upward relative movement of the sealing member while permitting relative rotative movement, and means engaging with the closure member and the sealing member and serving in co-operation with the first said means to apply a breaking force to the readily breakable top portion of the sealing member so as to break the said member upon a relative rotative movement of predetermined extent.

20. The combination of a closure member adapted to normally close a container opening, an externally visible preformed readily breakable sealing member structurally separate from the closure member and at least partly covering it to prevent removal thereof while the sealing member is in place and unbroken, the said sealing member being provided with a thread by which it is held in place, and means engaging with the closure member and the sealing member to break the latter upon relative movement thereof in the unscrewing direction.

21. In a device of the class described, the combination of a closure member adapted to normally close a container opening, a preformed molded sealing member constituting an outer closure adapted to substantially completely cover the first said closure member, the said sealing member having a thread by which it is held in place and being provided at the top with an externally visible readily breakable portion, and a metallic element structurally separate from the sealing member and adapted to permit free relative movement of the said member in the direction to screw it into its normal position, the said element being engageable with the top portion of the sealing member when the latter is in its normal position so as to break the said top portion upon relative movement of the sealing member in the opposite unscrewing direction.

22. In a device of the class described, the combination of a closure member adapted to normally close a container opening, a preformed sealing member constituting an outer closure adapted to substantially completely cover the first said closure member, the said sealing member having a thread by which it is held in place and being provided at the top with an externally visible readily breakable portion, and an element initially carried by the closure member at the top thereof entirely independently of the sealing member and adapted to permit free relative movement of the indicator member in the direction to screw it into its normal position, the said element being engageable with the top portion of the sealing member when the latter is in its normal position so as to break the said top portion upon relative movement of the sealing member in the opposite unscrewing direction.

23. In a device of the class described, the combination of a closure member adapted to normally close a container opening, a preformed molded sealing member provided with an externally visible readily breakable portion, the said sealing member being adapted to at least partly cover the closure member to prevent removal thereof while the sealing member is in place and unbroken and the said sealing member being threaded and adapted to be freely engaged with a thread on the container, and a metallic element structurally separate from the sealing member and adapted to permit free relative movement of the said member in the direction to screw it into its normal position on the container, the said element being engageable with the readily breakable portion of the sealing member when the latter is in its normal position so as to break the said readily breakable portion upon movement of the sealing member relative to the container in the opposite unscrewing direction.

24. The combination of a molded closure member adapted to normally close a container opening and adapted for use in conjunction with a preformed outer sealing member having a readily breakable integral portion at the top constituting an externally visible indicator, and a metallic element carried by the closure member at the top thereof and adapted to engage and break the said top portion of a sealing member upon a predetermined movement of the said sealing member relative to the closure member.

25. A performed sealing member of the cap type adapted to cover a container opening and having a thread adapted to engage a thread on the container, the said sealing member having an integral portion which constitutes an externally visible readily breakable indicator and is specifically shaped for engagement by a breaking element held against movement in unison with the sealing member whereby the said indicator portion is adapted to be broken when the sealing member is turned to unscrew it from its normal relationship with the container.

26. A preformed sealing member of the cap type adapted to at least partly cover a container closure member and having a thread adapted to engage a thread on the container, the said sealing member having an integral portion which constitutes an externally visible readily breakable indicator and is specifically shaped for engagement by a breaking element carried by the closure member and held against movement in unison with the sealing member whereby the said indicator portion is adapted to be broken when the sealing member is turned to unscrew it from its normal relationship with the closure member and the container.

27. A preformed sealing member of the cap type adapted to substantially completely cover a container closure member and having a thread adapted to engage a thread on the container, the said sealing member having an integral portion at the top which constitutes an externally visible readily breakable indicator and which is specifically shaped for engagement by a breaking element carried by the closure member whereby the said top portion is adapted to be broken when the sealing member is turned to unscrew it from its normal relationship with the closure member and the container.

28. In combination, a threaded closure member adapted to normally engage a thread on a container and to close the opening thereof, a preformed externally visible readily breakable sealing member adapted to at least partly cover the closure member to prevent removal thereof while the sealing member is in place and unbroken, the said sealing member having a thread of the same hand but of different pitch from that on the closure member and adapted to normally engage a corresponding different thread on the container whereby rotative movement of the closure and indicator members in unison in the unscrewing direction will cause the said members to rise at different rates and thereby break the sealing member, and a breaking element adapted to interengage between the closure and indicator members and adapted to break the indicator member when it is turned in the unscrewing direction relatively to the closure member.

29. In combination, a threaded closure member adapted to normally engage a thread on a container and to close the opening thereof, a preformed molded sealing member constituting an outer closure adapted to substantially completely cover the first said closure member and provided at the top with an externally visible readily breakable portion, the said sealing member having a thread of the same hand but of a different pitch from that on the closure member and adapted to normally engage a corresponding thread on the container whereby rotative movement of the closure and indicator members in unison in the unscrewing direction will cause the said members to rise at different rates and thereby break the sealing member, and a breaking element structurally separate from the sealing member and adapted to permit free relative movement of the said member in the direction to screw it into its normal position on the container, the said element being engageable with the top portion of the sealing member when the latter is in its normal position so as to break the said top portion upon relative movement of the sealing member in the opposite unscrewing direction.

JAMES P. BURKE.